United States Patent
Kim et al.

(10) Patent No.: US 9,553,287 B2
(45) Date of Patent: Jan. 24, 2017

(54) BATTERY PACK (71) Applicant: SAMSUNG SDI CO., LTD., Yongin-si (KR)

(72) Inventors: Myung-Chul Kim, Yongin-si (KR); Jang-Gun Ahn, Yongin-si (KR); Hee-Joon Jin, Yongin-si (KR); Young-Bin Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 86 days.

(21) Appl. No.: 14/465,612

(22) Filed: Aug. 21, 2014

(65) Prior Publication Data
US 2015/0064539 A1 Mar. 5, 2015

(30) Foreign Application Priority Data
Aug. 30, 2013 (KR) .......................... 10-2013-0103761

(51) Int. Cl.
H01M 2/10 (2006.01)
H01M 2/02 (2006.01)

(52) U.S. Cl.
CPC ......... *H01M 2/1077* (2013.01); *H01M 2/0237* (2013.01); *H01M 2/1094* (2013.01); *H01M 2220/20* (2013.01)

(58) Field of Classification Search
None
See application file for complete search history.

(56) References Cited

U.S. PATENT DOCUMENTS

| 2009/0253027 A1 | 10/2009 | Yang et al. | |
| 2011/0008659 A1* | 1/2011 | Okada | H01M 2/1077 429/90 |
| 2012/0070716 A1* | 3/2012 | Yoshioka | B60K 1/04 429/156 |

FOREIGN PATENT DOCUMENTS

| EP | 2 290 728 A1 | 3/2011 |
| JP | 2011-49012 | 3/2011 |
| KR | 2000-0002486 | 2/2000 |
| KR | 10-2007-0110567 | 11/2007 |
| KR | 10-2011-0126905 | 11/2011 |
| KR | 10-1243371 B1 | 3/2013 |

OTHER PUBLICATIONS

KIPO Office action dated May 9, 2016, for Korean priority Patent application 10-2013-0103761, (4 pages).

* cited by examiner

*Primary Examiner* — Miriam Stagg
*Assistant Examiner* — Carmen Lyles-Irving
(74) *Attorney, Agent, or Firm* — Lewis Roca Rothgerber Christie LLP (57) ABSTRACT

A battery pack including a plurality of bare cells electrically connected to one another; and a housing including a bottom portion accommodating the bare cells therein, a middle portion mounted on the bottom portion, and a top portion on the middle portion, the top portion including a first fastening portion, and the middle portion including a second fastening portion facing the first fastening portion, and at least a portion of the first fastening portion or the second fastening portion is spaced apart from the other of the first fastening portion or the second fastening portion.

16 Claims, 6 Drawing Sheets

BATTERY PACK

CROSS-REFERENCE TO RELATED APPLICATION

This application claims priority to and the benefit of Korean Patent Application No. 10-2013-0103761, filed on Aug. 30, 2013 in the Korean Intellectual Property Office, the entire content of which is incorporated herein by reference.

BACKGROUND

1. Field

Aspects of embodiments of the present invention relate to a battery pack.

2. Description of the Related Art

A high-power battery module using a non-aqueous electrolyte with high energy density has recently been developed. The high-power battery module is configured as a large-capacity battery module manufactured by connecting a plurality of battery cells in series, and is used, for example, in driving motors of devices requiring high power, e.g., electric vehicles, hybrid vehicles, and the like.

A battery pack may be formed by accommodating one or more battery modules in a housing. The battery pack may be used as a power source for an external device. In this case, bare cells constituting the battery module may be secondary batteries including a lithium compound, which can be reversibly charged/discharged. In order to stably use a lithium compound having excellent reactivity with moisture, various studies have been conducted to implement the light weight of a housing of a battery pack and to improve the safety of the battery pack.

SUMMARY

According to an aspect of embodiments of the present invention, a battery pack includes a novel housing.

According to another aspect of embodiments of the present invention, a battery pack has an improved waterproof structure.

According to one or more embodiments of the present invention, a battery pack includes: a plurality of bare cells electrically connected to one another; and a housing including a bottom portion accommodating the bare cells therein, a middle portion mounted on the bottom portion, and a top portion on the middle portion, the top portion including a first fastening portion, and the middle portion including a second fastening portion facing the first fastening portion, and at least a portion of the first fastening portion or the second fastening portion is spaced apart from the other of the first fastening portion or the second fastening portion.

The second fastening portion may include a base portion parallel to the first fastening portion, and a partition wall protruded toward the first fastening portion from the base portion.

The partition wall may include a first partition wall adjacent to an outer perimeter of the base portion; a second partition wall spaced apart from the first partition wall toward an inner perimeter of the base portion; and a third partition wall spaced apart from the second partition wall and adjacent to the inner perimeter of the base portion.

The first, second, and third partition walls may divide a space between the first and second fastening portions into a first space portion and a second space portion, and the first space portion may be between the first and second partition walls, and the second space portion may be between the second and third partition walls.

The battery pack may further include a buffer member between the first and second fastening portions, and the buffer member may be in the second space portion.

A thickness of the buffer member may be greater than a protruded thickness of the second partition wall from the base portion.

The first fastening portion may contact an end portion of the partition wall, and the buffer member may be compressed in the second space portion.

The buffer member may be forcibly inserted into the second space portion.

The bottom portion may include a box-shaped accommodating portion including an open side to accommodate the bare cells; and a third fastening portion at a perimeter of the accommodating portion, and the third fastening portion may face the second fastening portion.

A first height from the base portion of a first surface of the second partition wall that faces the first space portion may be greater than a second height from the base portion of a second surface of the second partition wall that faces the second space portion.

A depth of the first space portion may be greater than that of the second space portion.

A portion of the middle portion may be accommodated inside the accommodating portion of the bottom portion, and the second fastening portion of the middle portion may be mounted on the third fastening portion.

The top portion may be spaced apart from the portion of the middle portion, and the first fastening portion may be parallel to the second fastening portion.

The first, second, and third fastening portions may be parallel to each other and facing one another, and one or more fastening holes may be formed in each of the first and second fastening portions.

The one or more fastening holes formed in the first fastening portion and the one or more fastening holes formed in the second fastening portion may be formed at positions corresponding to each other.

The third fastening portion may include one or more fastening projections corresponding to the one or more fastening holes of the first and second fastening portions.

The one or more fastening projections may be fastened to a fastening member at an outside of the first fastening portion.

As described above, according to an aspect of embodiments of the present invention, a battery pack includes a novel housing.

Further, according to another aspect of embodiments of the present invention, a battery pack has an improved waterproof structure.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein. Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. It will be understood that when an element is referred to as being "between" two elements, it can be the only element between the two elements, or one or more intervening elements may also be present. In addition, when an element is referred to as being "on" another element, it can be directly on the another element or indirectly on the another element with one or more intervening elements interposed therebetween. Similarly, when an element is referred to as being "connected to" another element, it can be directly connected to the another element or indirectly connected to the another element with one or more intervening elements interposed therebetween.

Figure 1:
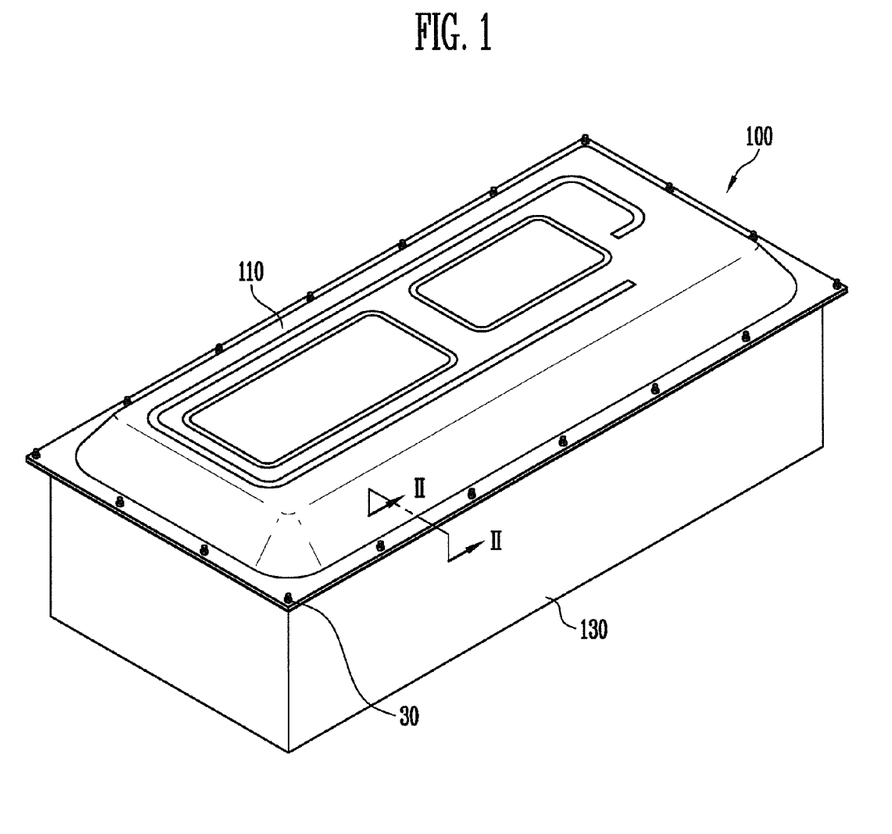
FIG. 1 is a perspective view of a battery pack according to an embodiment of the present invention.
Figure 2:
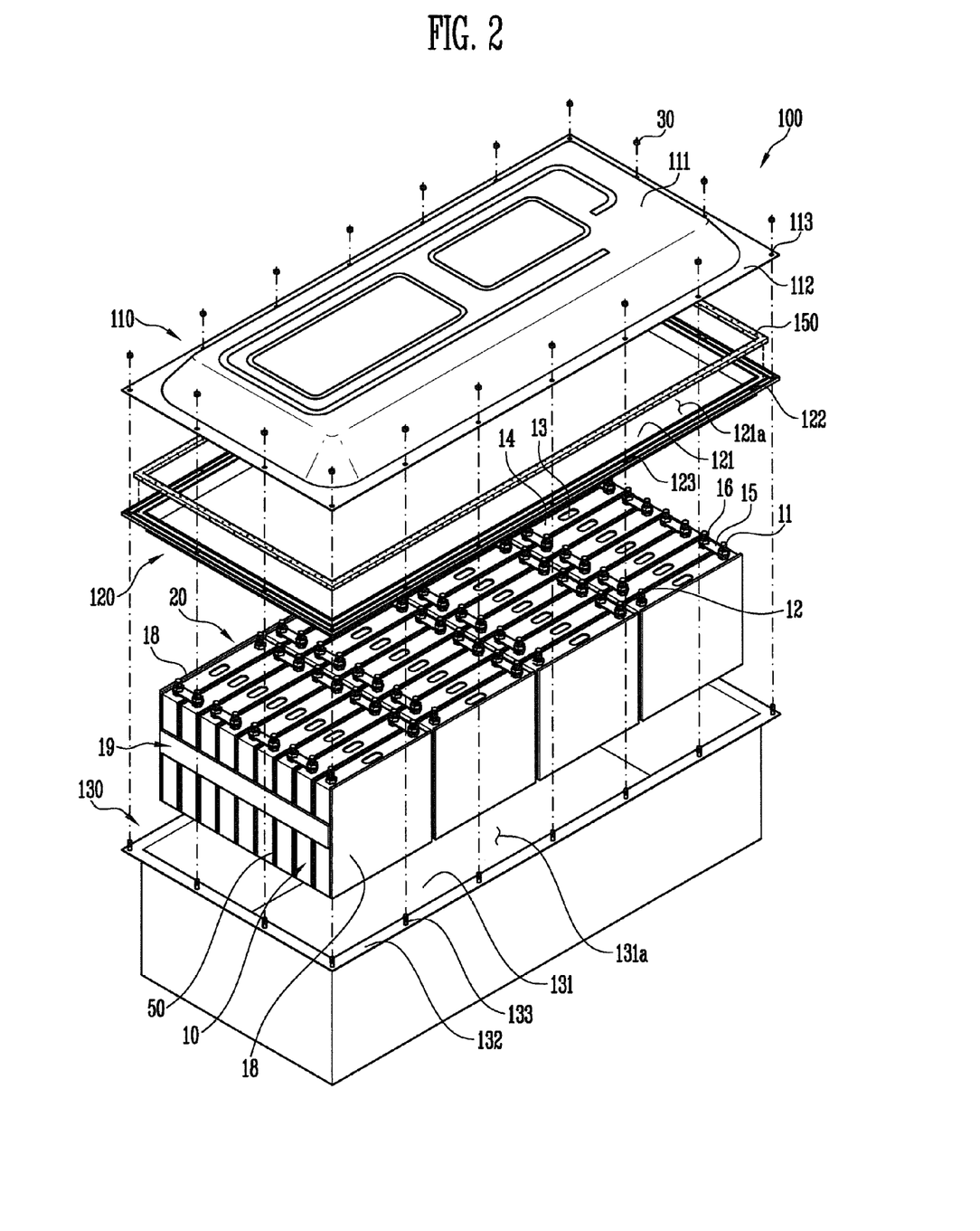
FIG. 2 is an exploded perspective view of the battery pack of FIG. 1.

FIG. 1 is a perspective view of a battery pack according to an embodiment of the present invention. FIG. 2 is an exploded perspective view of the battery pack of FIG. 1.

A battery pack 100 according to an embodiment of the present invention includes a plurality of bare cells 10 electrically connected to one another; and a housing including a bottom portion 130 accommodating the bare cells 10 therein, a middle portion 120 mounted on a top of the bottom portion 130, and a top portion 110 provided at a top of the middle portion 120. The top portion 110 is provided with a first fastening portion 112, and the middle portion 120 is provided with a second fastening portion 122 facing the first fastening portion 112. At least a portion between the first and second fastening portions 112 and 122 may be spaced. In one embodiment, a buffer member 150 is interposed between the first and second fastening portions 112 and 122.

A plurality of battery modules 20 may be provided in the housing. The battery module 20 may be provided by aligning a plurality of the bare cells 10 and bundling the plurality of battery cells 10, such as using a pair of end plates 18 and a connecting member 19 for connecting the end plates 18. In one embodiment, barriers 50 may be respectively provided between the aligned bare cells 10. The barrier 50 allows adjacent bare cells 10 to be spaced apart from each other, thereby providing a flow path of a fluid, such as a heat exchange medium. The heat exchange medium may be heat-exchanged with the bare cells 10 to control the temperature of the bare cells 10.

The bare cell 10 may be a secondary battery which can be reversibly charged/discharged. The bare cell 10 may include a battery case, and an electrode assembly and an electrolyte, which are accommodated in the battery case. The battery case, in one embodiment, is hermetically sealed with a cap assembly 14 having a positive electrode terminal 11, a negative electrode terminal 12, and a vent 13. The electrode assembly and the electrolyte generate electrochemical energy by a reaction therebetween, and the generated energy is transferred to the outside of the bare cell 10 through the positive and negative electrode terminals 11 and 12. In one embodiment, the positive and negative electrode terminals 11 and 12 of adjacent bare cells 10 are electrically connected through a bus bar 15, and the bus bar 15 may be fixed to the positive and negative electrode terminals 11 and 12 of the adjacent bare cells 10 using a member such as a nut 16. The vent 13 is a safety member of the bare cell 10, which acts as a passage through which gas generated inside the bare cell 10 may be exhausted to the outside of the bare cell 10.

The bare cells 10 electrically and physically connected in the form of the battery module 20 may be accommodated in the housing. The housing, in one embodiment, includes the top portion 110, the middle portion 120, and the bottom portion 130. The battery modules 20 may be accommodated in the bottom portion 130.

The bottom portion 130, in one embodiment, includes a box-shaped accommodating portion 131 of which one side is open to accommodate the bare cells 10 (or the battery modules 20), and a third fastening portion 132 is provided at a perimeter of the accommodating portion 131. The third fastening portion 132 may face the second fastening portion 122. In one embodiment, the third fastening portion 132 is provided to surround the open side of the accommodating portion 131. The third fastening portion 132 may be extended to the outside of the accommodating portion 131. The bare cells 10 (or the battery modules 20) may be accommodated in an inside 131a of the accommodating portion 131. Although not shown in the drawings, an inlet, an outlet, etc., through which a heat exchange medium for performing a heat exchange with the bare cell 10 is flowed in the battery pack or flowed out from the battery pack, may be provided at a part of the bottom portion 130, such as at a side surface of the bottom portion 130.

In one embodiment, a middle body portion 121 of the middle portion 120 is inserted into the inside 131a of the accommodating portion 131 of the bottom portion 130. The second fastening portion 122 of the middle portion 120 may be mounted on the third fastening portion 132. In one embodiment, when the bare cells 10 are accommodated in the accommodating portion 131 of the bottom portion 130, an extra space exists above the bare cells 10. The middle body portion 121 may be inserted into the extra space above the bare cells 10. The middle body portion 121 may be spaced apart from the bare cells 10. The second fastening portion 122 is provided at a perimeter of the middle body portion 121, to be mounted on the third fastening portion 132.

The top portion 110 is provided to be spaced apart at a portion from the middle portion 120. In one embodiment, the first fastening portion 112 of the top portion 110 may be provided in parallel with the second fastening portion 122. In one embodiment, the top portion 110 may include a top body portion 111 configured to face the middle body portion 121, and the first fastening portion 112 provided at a perimeter of the top body portion 111.

The top body portion 111 of the top portion 110 may be protruded in a direction opposite from that of the middle body portion 121 of the middle portion 120 such that a space is provided therebetween. The space between the top body portion 111 and the middle body portion 121 may be made of together of an inside of the top body portion 111 and an inside 121a of the middle body portion 121. The first fastening portion 112 connected to the top body portion 111 and the second fastening portion 122 connected to the middle body portion 121 are overlapped with each other, to support the top body portion 111 and the middle body portion 121 such that the top body portion 111 and the middle body portion 121 are spaced apart from each other. In one embodiment, an electronic component such as a battery management system (BMS), which is electrically connected to the battery module 20, may be mounted in the inside 121a of the middle body portion 121.

The top portion 110, the middle portion 120, and the bottom portion 130 are stacked (e.g., sequentially stacked). The first to third fastening portions 112, 122, and 132 respectively provided to the top portion 110, the middle portion 120, and the bottom portion 130 may be provided in parallel to face each other. In one embodiment, one or more fastening holes 113 may be formed in the first fastening portion 112, and one or more fastening holes 123 may be formed in the second fastening portion 122. The fastening holes 113 formed in the first fastening portion 112, and the fastening holes 123 formed in the second fastening portion 122 may be provided at positions corresponding to each other. The third fastening portion 132 may include one or more fastening projections 133 (e.g., threaded fastening projections) protruded to correspond to the fastening holes 113 and 123.

In one embodiment, the fastening projections 133 may be inserted into the fastening holes 113 and 123 of the first and second fastening portions 112 and 122 and then fixed by being fastened with a fastening member 30 (e.g., a threaded nut) on an outer surface of the first fastening portion 112. The fastening projections 133 inserted into the fastening holes 113 and 123 may guide the positions of the middle portion 120 and the top portion 110 at the top of the bottom portion 130. Thus, the bottom portion 130, the middle portion 120, and the top portion 110 can be easily aligned at a correct position. The fastening holes 113 and 123, in one embodiment, may be provided not to overlap with the buffer member 150.

A portion at which the first and second fastening portions 112 and 122 are overlapped with each other and a portion at which the first and second fastening portions 112 and 122 are spaced apart from each other may be provided between the first and second fastening portions 112 and 122. The buffer member 150 may be provided at the spaced apart portion. In one embodiment, one or more partition walls may be provided to at least one of the first and second fastening portions 112 and 122, to allow portions of the first and second fastening portions 112 and 122 to be spaced apart from each other. It is described further below that, in one embodiment, one or more partition walls are provided to the second fastening portion 122. However, the present invention is not limited thereto, and, in another embodiment, partition walls may be provided to the first fastening portion 112.

Figure 3:
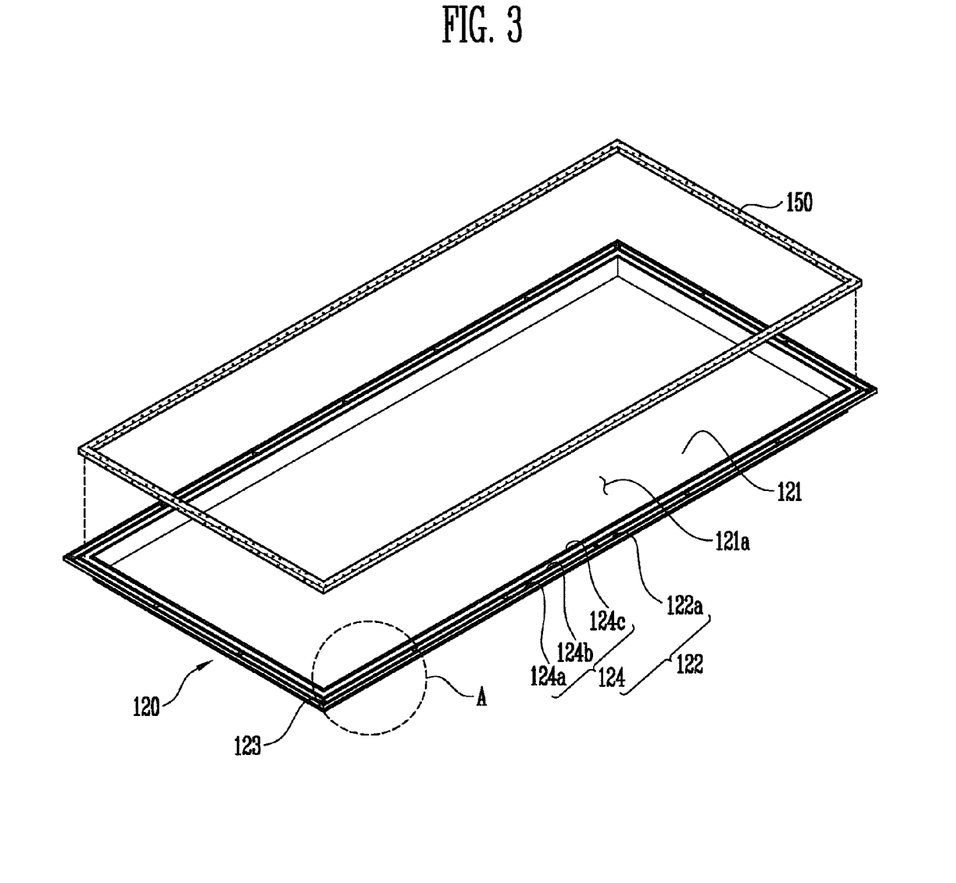
FIG. 3 is a perspective view of a middle portion and a buffer member of the battery pack of FIG. 1, according to an embodiment of the present invention.
Figure 4A:
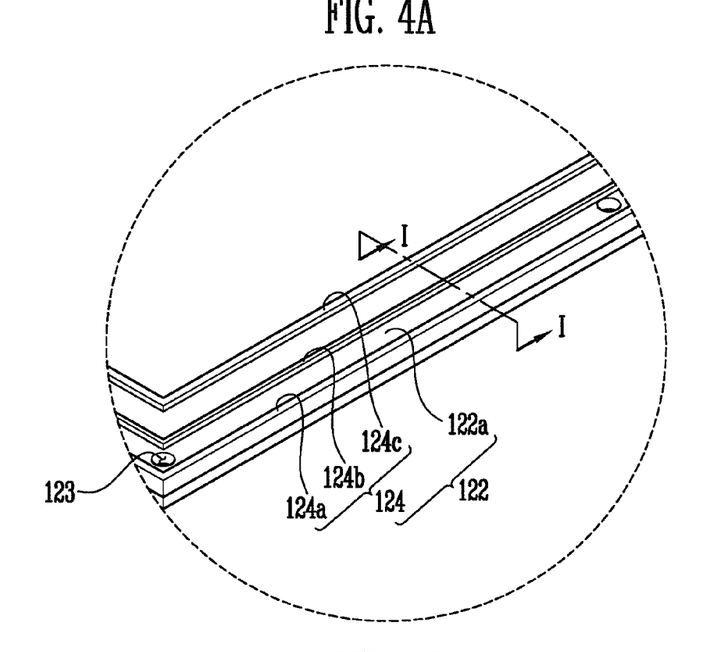
FIG. 4A is an enlarged view showing the region "A" of FIG. 3.
Figure 4B:
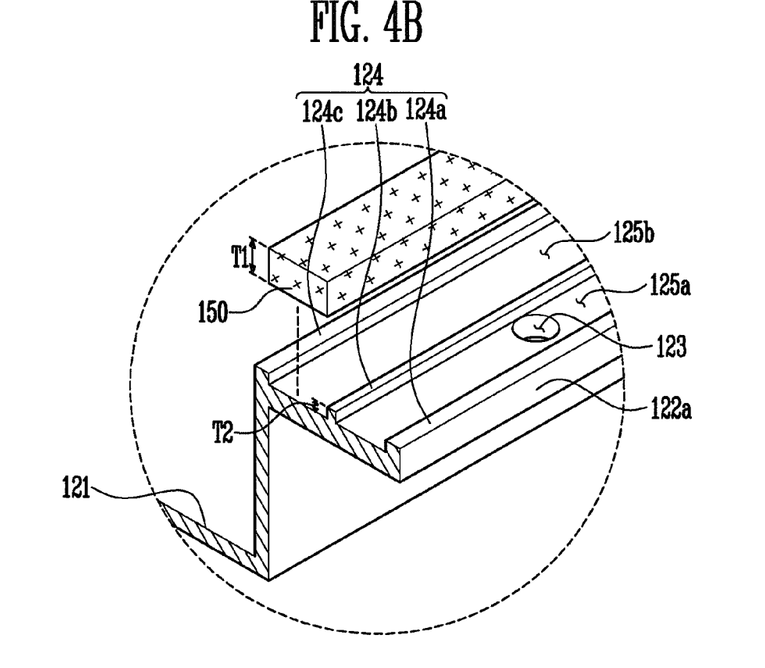
FIG. 4B is a sectional view taken along the line I-I of FIG. 4A.
Figure 5:
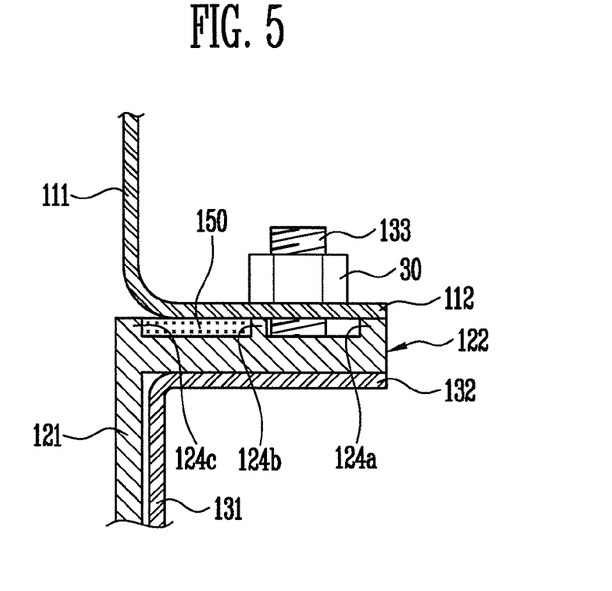
FIG. 5 is a sectional view taken along the line II-II of FIG. 1.

FIG. 3 is a perspective view of the middle portion 120 and the buffer member 150, according to an embodiment of the present invention. FIG. 4A is an enlarged view showing the region "A" of FIG. 3. FIG. 4B is a sectional view taken along the line I-I of FIG. 4A. FIG. 5 is a sectional view taken along the line II-II of FIG. 1.

Referring to FIG. 3, the second fastening portion 122, in one embodiment, may include a base portion 122a provided in parallel to the first fastening portion 112, and a partition wall 124 protruded toward the first fastening portion 112 from the base portion 122a to allow portions of the first and second fastening portions 112 and 122 to be spaced apart from each other. The partition wall 124, in one embodiment, may include a first partition wall 124a provided adjacent to an outer perimeter of the base portion 122a, a second partition wall 124b spaced apart from the first partition wall 124a to be provided inside the base portion 122a, and a third partition wall 124c spaced apart from the second partition wall 124b to be provided adjacent to an inner perimeter of the base portion 122a. The first to third partition walls 124a, 124b, and 124c may be spaced apart from each other at an interval (e.g., a predetermined interval) and extended in parallel to each other on the base portion 122a.

Referring to FIGS. 4A and 4B, in one embodiment, the first to third partition walls 124a, 124b, and 124c divide the base portion 122a into a first space portion 125a and a second space portion 125b. The first space portion 125a is provided between the first and second partition walls 124a and 124b, and the second space portion 125b is provided between the second and third partition walls 124b and 124c, such that the first and second space portions 125a and 125b are at a perimeter of the bare cells 10. The buffer member 150 may be interposed between the first and second fastening portions 112 and 122. In one embodiment, the buffer member 150 is inserted into the second space portion 125b, and the first space portion 125a is provided as an empty space, and the second space portion 125b is filled by the buffer member 150.

In one embodiment, a thickness T1 of the buffer member 150 is greater than a protruded thickness T2 of the second partition wall 124b, and the buffer member 150 may be forcibly inserted into the second space portion 125b. In one embodiment, for example, the buffer member 150 may be made of a material having elasticity, such as sponge. The buffer member 150 inserted into the second space portion 125b may protrude above the second partition wall 124b.

Referring to FIG. 5, the second fastening portion 122 is fastened to the first fastening portion 112. In one embodiment, the buffer member 150 protruding above the second partition wall 124b may be compressed by the first fastening portion 112. That is, the first to third fastening portions 112, 122, and 132 are fixed by the protruding projection 133, the fastening holes 113 and 123, and the fastening member 30. In one embodiment, the first to third fastening portions 112, 122, and 132 may be fastened while compressing the buffer member 150. The first fastening portion 112 may contact an end portion of the partition wall 124 by compressing the buffer member 150. In one embodiment, the fastening holes 123 are provided in the first space portion 125a, such that the fastening projections 133 do not pass through the buffer member 150.

The bare cell 10, in one embodiment, may include a compound such as a lithium compound having excellent reactivity with water. In addition, the bare cell 10, the electronic component, and the like are provided inside the housing, and, therefore, it is necessary that the inflow of moisture be prevented or substantially prevented. While in a housing of a battery pack, a parting portion at which a top portion, a middle portion, and a bottom portion are fastened to one another may be susceptible to the inflow of moisture or the like, in the battery pack according to embodiments of the present invention, the first and second space portions 125a and 125b and the buffer member 150 absorbing the moisture are further provided at the parting portion where the top portion 110, the middle portion 120, and the bottom portion 130 are fastened to one another. Thus, moisture that may enter in the housing is blocked or mostly blocked, such that the lifespan of the battery pack is improved.

In one embodiment, the first and second space portions 125a and 125b are provided between the first and second fastening portions 112 and 122. In this case, a space is provided in the first space portion 125a provided at an outside of the battery pack 100, and the buffer member 150 may be provided in the second space portion 125b. Thus, the moisture entering between the first and second fastening portions 112 and 122 may be primarily received in the first space portion 125a, and, accordingly, it is possible to block the moisture flowed into an inside of the housing. In addition, a portion of the moisture flowed out from the first space portion 125a, that is, entering into the second space portion 125b, may be absorbed in the buffer member 150. The flow of the moisture in the battery pack 100 can be effectively blocked by the first space portion 125a, and it is possible to decrease the amount of the moisture to be absorbed by the buffer member 150. The buffer member 150 is forcibly inserted into the second space portion 125, such that the fastening between the first to third fastening portions 112, 122, and 132 can be firmly performed. Further, due to the buffer member 150, it is possible to further ensure that a flow of the moisture into the battery pack 100 is blocked.

Another embodiment of the present invention is described below with reference to FIGS. 6A and 6B. Components and features of this embodiment, except as described below, may be the same or similar to those of the battery pack 100 described above with reference to FIGS. 1 to 5, and, therefore, further detailed description thereof will not be repeated.

Figure 6A:
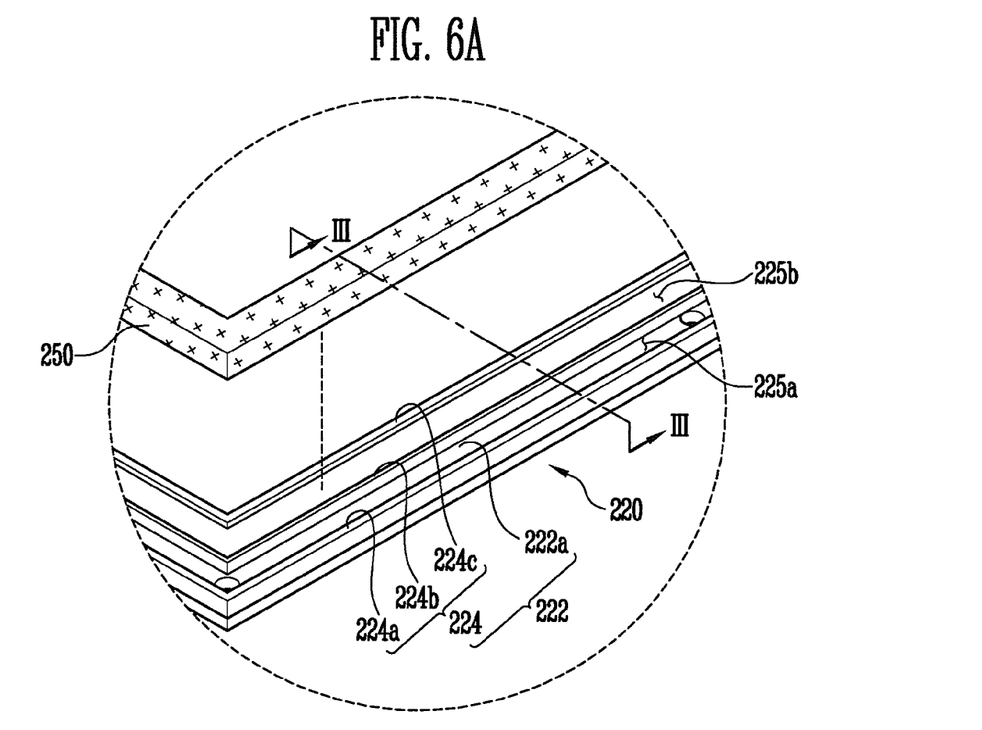
FIG. 6A is a schematic partial perspective view of a middle portion and a buffer member of a battery pack, according to another embodiment of the present invention.

FIG. 6A is a schematic partial perspective view of a middle portion and a buffer member of a battery pack, according to another embodiment of the present invention. FIG. 6B is a sectional view taken along the line III-III of FIG. 6A.

Figure 6B:
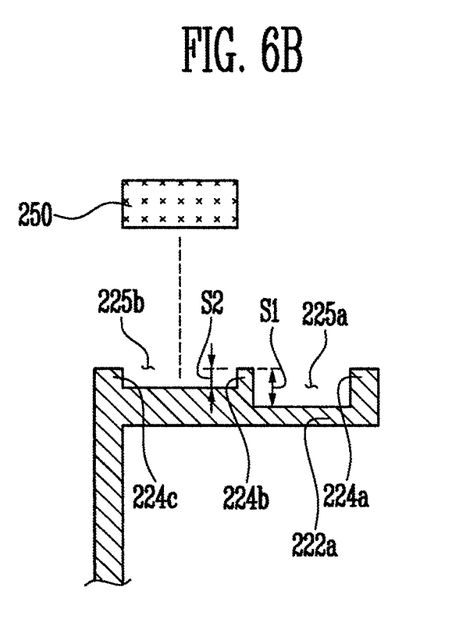
FIG. 6B is a sectional view taken along the line III-III of FIG. 6A.

Referring to FIGS. 6A and 6B, the battery pack according to another embodiment of the present invention may include a housing, and one or more battery modules provided inside the housing. The housing may include a bottom portion configured to accommodate the battery modules, and a middle portion 220 and a top portion, which are provided at a top of the bottom portion. A buffer member 250 may be provided between the middle portion 220 and the top portion, and the middle portion 220 may be provided with a second fastening portion 222 through which the middle portion 220 is fastened to the top portion and the bottom portion.

The second fastening portion 222, in one embodiment, includes a base portion 222a, and a partition wall 224 vertically protruded on the base portion 222a. The partition wall 224, in one embodiment, includes first, second, and third partition walls 224a, 224b, and 224c provided adjacent one another from an outside toward an inside of the partition wall 224. A first space portion 225a may be provided between the first and second partition walls 224a and 224b, and a second space portion 225b may be provided between the second and third partition walls 224b and 224c.

The buffer member 250 is inserted into the second space portion 225b, and the first space portion 225a may have a space in which moisture entering into the first space portion 225a is confined. The second partition wall 224b provided between the first and second space portions 225a and 225b may be provided such that an outer surface and an inner surface of the second partition wall 224b have different heights from each other. In one embodiment, a first height S1 of the second partition wall 224b protruded from a surface of the base portion 222a, which faces the first space portion 225a, is greater than a second height S2 of the second partition wall 224b protruded from a surface of the base portion 222a, which faces the second space portion 225b. Thus, in one embodiment, a depth of the first space portion 225a is formed deeper than that of the second space portion 225b. The buffer member 250 may be provided while being compressed in the second space portion 225b. The space of the first space portion 225a is formed deeper than that of the second space portion 225b, such that a greater amount of moisture can be confined in the first space portion 225a. Thus, it is possible to further decrease the amount of moisture to be absorbed by the buffer member 250. Therefore, moisture is effectively blocked from entering in the battery pack.

While the present invention has been described in connection with certain exemplary embodiments, it is to be understood that the invention is not limited to the disclosed embodiments. Although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims and equivalents thereof.

What is claimed is:

1. A battery pack comprising:
   a plurality of bare cells electrically connected to one another; and
   a housing comprising a bottom portion accommodating the bare cells therein, a middle portion mounted on the bottom portion, and a top portion on the middle portion,
   wherein the top portion comprises a first fastening portion, and the middle portion comprises a second fastening portion facing the first fastening portion,
   wherein at least a portion of the first fastening portion or the second fastening portion is spaced apart from the other of the first fastening portion or the second fastening portion by a partition wall to define a space between the first and second fastening portions,
   wherein the battery pack further comprises a buffer member in the space between the first and second fastening portions,
   wherein the bottom portion comprises a box-shaped accommodating portion including an open side to accommodate the bare cells; and a third fastening portion at a perimeter of the accommodating portion, and
   wherein the third fastening portion faces the second fastening portion.

2. The battery pack of claim 1, wherein the second fastening portion comprises a base portion parallel to the first fastening portion, and the partition well protruded toward the first fastening portion from the base portion.

3. The battery pack of claim 2, wherein the partition wall comprises a first partition wall adjacent to an outer perimeter of the base portion; a second partition wall spaced apart from the first partition wall toward an inner perimeter of the base portion; and a third partition well spaced apart from the second partition wall and adjacent to the inner perimeter of the base portion.

4. The battery pack of claim 3,
wherein the first, second, and third partition walls divide the space between the first and second fastening portions into a first space portion and a second space portion, and
wherein the first space portion between the first and second partition walls, and the second space portion is between the second and third partition walls.

5. The battery pack of claim 4, wherein the buffer member is in the second space portion.

6. The battery pack of claim 5, wherein a thickness of the buffer member is greater than a protruded thickness of the second partition wall from the base portion.

7. The battery pack of claim 6, wherein the first fastening portion contacts an end portion of the partition wall, and the buffer member is compressed in the second space portion.

8. The battery pack of claim 5, wherein the buffer member is forcibly inserted into the second space portion.

9. The battery pack of claim 4, wherein a first height from the base portion of a first surface of the second partition wall that faces the first space portion is greater than a second height from the base portion of a second surface of the second partition wall that faces the second space portion.

10. The battery pack of claim 9, wherein a depth of the first space portion is greater than that of the second space portion.

11. The battery pack of claim 1, wherein a portion of the middle portion is accommodated inside the accommodating portion of the bottom portion, and the second fastening portion of the middle portion is mounted on the third fastening portion.

12. The battery pack of claim 11, wherein the top portion is spaced apart from the portion of the middle portion, and the first fastening portion is parallel to the second fastening portion.

13. The battery pack of claim 1, wherein the first, second, and third fastening portions are parallel to each other and facing one another, and one or more fastening holes are formed in each of the first and second fastening portions.

14. The battery pack of claim 13, wherein the one or more fastening holes formed in the first fastening portion and the one or more fastening holes formed in the second fastening portion are formed at positions corresponding to each other.

15. The battery pack of claim 14, wherein the third fastening portion comprises one or more fastening projections corresponding to the one or more fastening holes of the first and second fastening portions.

16. The battery pack of claim 15, wherein the one or more fastening projections are fastened to a fastening member at an outside of the first fastening portion.

* * * * *

UNITED STATES PATENT AND TRADEMARK OFFICE
CERTIFICATE OF CORRECTION

PATENT NO. : 9,553,287 B2  
APPLICATION NO. : 14/465612  
DATED : January 24, 2017  
INVENTOR(S) : Myung-Chul Kim et al.

Page 1 of 1

It is certified that error appears in the above-identified patent and that said Letters Patent is hereby corrected as shown below:

In the Claims

Column 8, Line 64, Claim 2      delete "well" and insert -- wall --

Column 9, Line 3, Claim 3      delete "well" and insert -- wall --

Column 9, Line 11, Claim 4      after "portion" insert -- is --

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*